United States Patent [19]

Sugiura et al.

[11] Patent Number: 4,533,928

[45] Date of Patent: Aug. 6, 1985

[54] COLOR IMAGE PROCESSING APPARATUS

[75] Inventors: Susumu Sugiura, Yamato; Yasuo Kohzato, Yokohama, both of Japan

[73] Assignee: Canon Kabushiki Kaisha, Tokyo, Japan

[21] Appl. No.: 486,900

[22] Filed: Apr. 20, 1983

[30] Foreign Application Priority Data

Apr. 30, 1982 [JP] Japan .................................. 57-71372
May 6, 1982 [JP] Japan .................................. 57-74560

[51] Int. Cl.³ ........................................... G01D 15/18
[52] U.S. Cl. .................................. 346/140 R; 358/78; 358/80; 400/126
[58] Field of Search ........................... 358/75, 78, 80; 346/140, 75; 400/240.4, 470, 126, 124, 120

[56] References Cited

U.S. PATENT DOCUMENTS

| 3,144,510 | 8/1964 | Farber | 358/80 |
| 3,787,884 | 1/1974 | Demer | 346/75 |
| 4,350,996 | 9/1982 | Rosenfeld | 358/75 |
| 4,403,874 | 9/1983 | Payne | 358/78 X |
| 4,413,275 | 11/1983 | Horiuchi | 358/75 |

*Primary Examiner*—Joseph W. Hartary
*Attorney, Agent, or Firm*—Fitzpatrick, Cella, Harper & Scinto

[57] ABSTRACT

A color image processing apparatus, such as a color ink jet printer capable of avoiding aberration in the images formed in the forward and reverse motions of the recording carriage, by effecting different image processings in the forward and in the reverse motions.

11 Claims, 10 Drawing Figures

A

B

COLOR IMAGE PROCESSING APPARATUS

BACKGROUND OF THE INVENTION

1. Field of the Invention

The present invention relates to a color image processing apparatus for processing color images.

2. Description of the Prior Art

As an example of a color printer, a color ink jet printer is composed as shown in FIG. 1, wherein first to fourth nozzle heads 2-1-2-4 arranged from right to left respectively emit cyan (C), magenta (M), yellow (Y) and black (K) colored inks supplied respectively from ink reservoirs 4 through flexible tubes 3, and driving signals to said nozzle heads are supplied by plural wires in flexible cables 4-1-4-4, a terminal plate 5 and a combined flexible cable 6. A carriage 1 of the above-described structure is supported by two rails 7 and is put into reciprocating motion to perform main scanning in a direction X by an endless belt 8 driven by a stepping motor 9, while a recording sheet 11 extended between paired rollers 12, 13 is advanced in a direction Y to perform subsidiary scanning by a stepping motor 14 linked to the paired rollers 13, whereby a color image is recorded on said recording sheet 11 by colored inks emitted from the nozzle heads 2-1-2-4. The range of the main scanning is limited by stoppers 10-1, 10-2 positioned on both ends of the reciprocating path of the carriage 1. A sensor 15 is provided on the carriage 1 to detect the image recorded by the nozzle heads 2-1-2-4, while another sensor 16 is provided in a position distant in the feeding direction of the recording sheet 11 by the paired rollers 13 to detect the recorded image in the direction of subsidiary scanning.

In the ink jet printer of such structure, with the nozzle heads 2-1-2-4 arranged in the order of cyan (C), magenta (M), yellow (Y) and black (K) colors on the carriage 1, the order of color ink dots superposed on the recording sheet 11 when the carriage runs to the right is opposite to that when the carriage runs to the left, as will be apparent from the comparison of the subdivisions A, B, C and D in Fig. 2. In order to record a color image with intermediate tones, inks of complementary colors of cyan (C), magenta (M) and yellow (Y) respectively corresponding to red (R), green (G) and blue (B) are employed and superposed to achieve subtractive mixing necessary for reproducing intermediate tones. Also each ink does not represent genuine complementary color since the density change at the boundary of spectral region is not sharp. Consequently, in case the dots of inks of such complementary colors are deposited superposedly on the recording sheet 11, the mixing of colors varies according to the order of deposition of ink because the ink dot directly deposited on said recording sheet 11 does not expand due to sufficient absorption into the sheet while other ink dots show expansion due to insufficient absorption into the sheet, thus leading to different size relationships of the ink dots depending on the order of deposition, and also because the absorption and reflection of the incoming light are affected by the vertical order of the ink dots. In the conventional color ink jet printer, the intermediate color tone obtained by the main scanning motion of the ink nozzle heads becomes different in the forward motion and in the reverse motion due to the above-explained reasons, thus significantly deteriorating the quality of the recorded color image.

SUMMARY OF THE INVENTION

An object of the present invention is to provide a color image processing apparatus capable of avoiding the aforementioned drawbacks and reproducing color images with a high image quality.

Another object of the present invention is to provide a color image processing apparatus capable of recording color images without aberration in the color tone between the forward and reverse motions of the recording means.

Still another object of the present invention is to provide a color image processing apparatus in which different color correction processes are employed respectively in the forward and reverse motions of the recording means.

The foregoing and still other objects of the present invention will become fully apparent from the following description.

DETAILED DESCRIPTION OF THE PREFERRED EMBODIMENTS

Now the present invention will be clarified in detail by the following description which is to be taken in conjunction with the attached drawings.

At first reference is made to FIGS. 3A and 3B for explaining the method of masking for correcting the aberration of intermediate color tone in the subtractive mixing resulting from the aberrations in the spectral characteristics of the complementary color inks.

There is the following relationship between three complementary color signals C, M, Y obtained by complementary conversion on three primary color signals R, G, B and three corrected complementary color signals $C_0$, $M_0$, $Y_0$ obtained by corrections according to the aberrations in the spectral characteristics of the complementary color inks:

$$\begin{pmatrix} Y_0 \\ M_0 \\ C_0 \end{pmatrix} = \begin{pmatrix} 1 & ym & yc \\ my & 1 & mc \\ Cy & Cm & 1 \end{pmatrix} \begin{pmatrix} Y \\ M \\ C \end{pmatrix}$$

wherein Cm, Cy, my, mc, ym, yc are masking coefficients between complementary colors. Therefore, $Y_0 = Y + ymM + ycC$ $$M_0 = myY + M + mcC$$

$$C_0 = CyY + CmM + C$$

In the actual masking process, the levels of the corrected complementary color signals respectively corresponding to 16 levels of the complementary colors are in advance stored as a table in a random access memory, and the levels of said corrected complementary color signals $C_0$, $M_0$, $Y_0$ are read in response to the levels of the complementary color signals C, M, Y to be recorded and are supplied to the ink nozzle heads for recording. More specifically, as shown in FIG. 3A, the above-mentioned masking coefficients are suitably selected for example by variable resistors provided in a console 17 and are supplied to a central processing unit (CPU) 18 to calculate the data of levels of the corrected complementary color signals $C_0$, $M_0$, $Y_0$ from the above-explained equations respectively corresponding to the 16 levels of the complementary color signals C, M, Y, and the results of said calculation are stored in a random access memory (RAM) 19. Said storage is made in the form of a so-called masking table, in which, as shown in FIG. 3B, the addresses (ADR) 20 are composed of 16-level data of the three complementary color signals C, M, Y and the corresponding level data of three corrected complementary color signals $C_0$, $M_0$, $Y_0$ are stored in each address of a memory 21.

Figure 4:
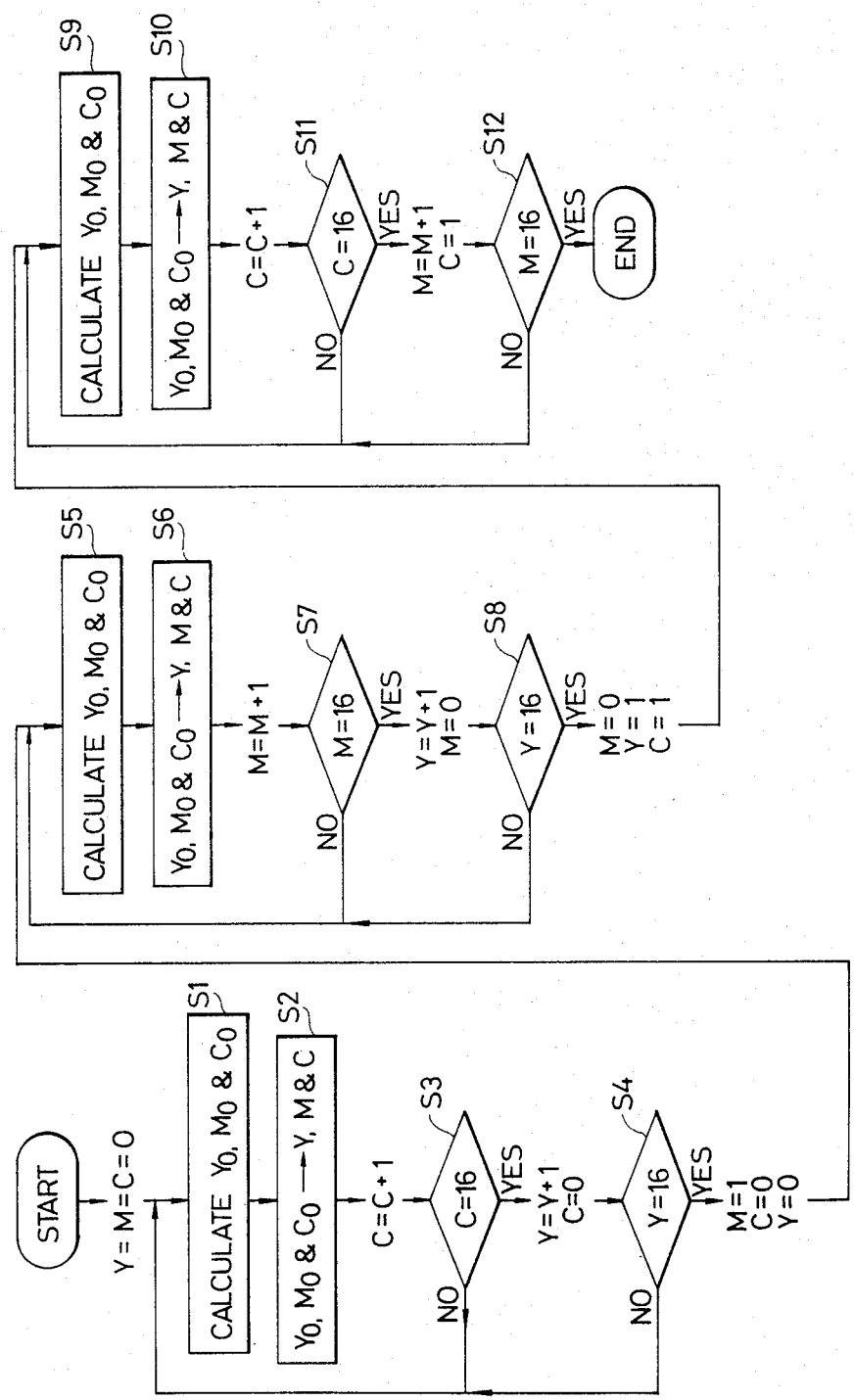
FIG. 4 is a flow chart showing a mode of function of said masking circuit.

The preparation of the masking table in the aforementioned central processing unit 18 is conducted according to the flow chart shown in FIG. 4. Said flow chart starts from a state $Y=M=C=0$. A step $S_1$ calculates $Y_0$, $M_0$, $C_0$ and a step $S_2$ stores the results of said calculation into a memory area to be addressed by Y, M, C, and these procedures are repeated in steps $S_3$ and $S_4$ for stepping up the levels of C and Y for 16 different levels. Then steps $S_5$–$S_8$ are executed, starting from a state $M=1$, $C=0$ and $Y=0$, to calculate and store the level data of $Y_0$, $M_0$, $C_0$ for 16 different levels of M and Y, and then steps $S_9$–$S_{12}$ are executed, starting from a state $M=0$, $Y=1$ and $C=1$, to calculate and store the level data of $Y_0$, $M_0$, $C_0$ for 16 different levels of C and M.

Figure 5:
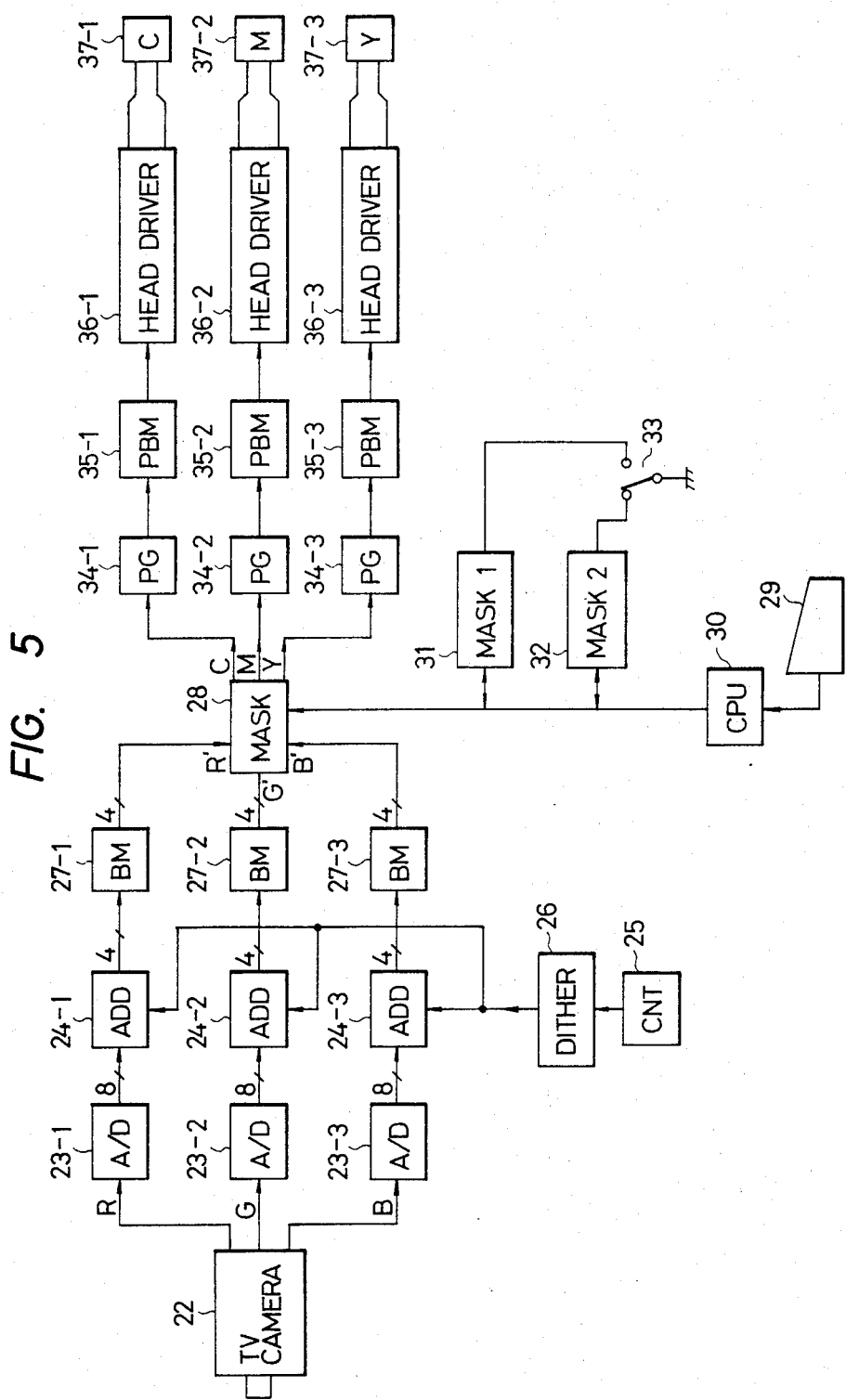
FIG. 5 is a block diagram showing an example of the record signal control circuit for use in the color ink jet printer of the present invention.

FIG. 5 shows an example of a recording signal control circuit for use in the ink jet printer of the present invention, wherein three primary color image signals R, G, B obtained from a color television camera 22 are respectively supplied to analog-to-digital (A/D) converters 23-1–23-3 to obtain 8-bit digital primary color signals. Said signals are respectively supplied to adders 24-1–24-3, and random signals supplied from a dither circuit 26 driven by a counter (CNT) 25 are added to the lower 4 bits of said color signals to obtain 16-level digital primary color signals R', G', B' represented by the upper 4 bits of said 8-bit color signals. Said 16-level color image signals are respectively supplied, through buffer memories 27-1–27-3, to a masking memory 28. The above-mentioned random signals may be signals of a determined interval.

The above-mentioned data compression on the primary color image signals prior to the masking process allows to reduce the capacity of the masking memory.

Figure 1:
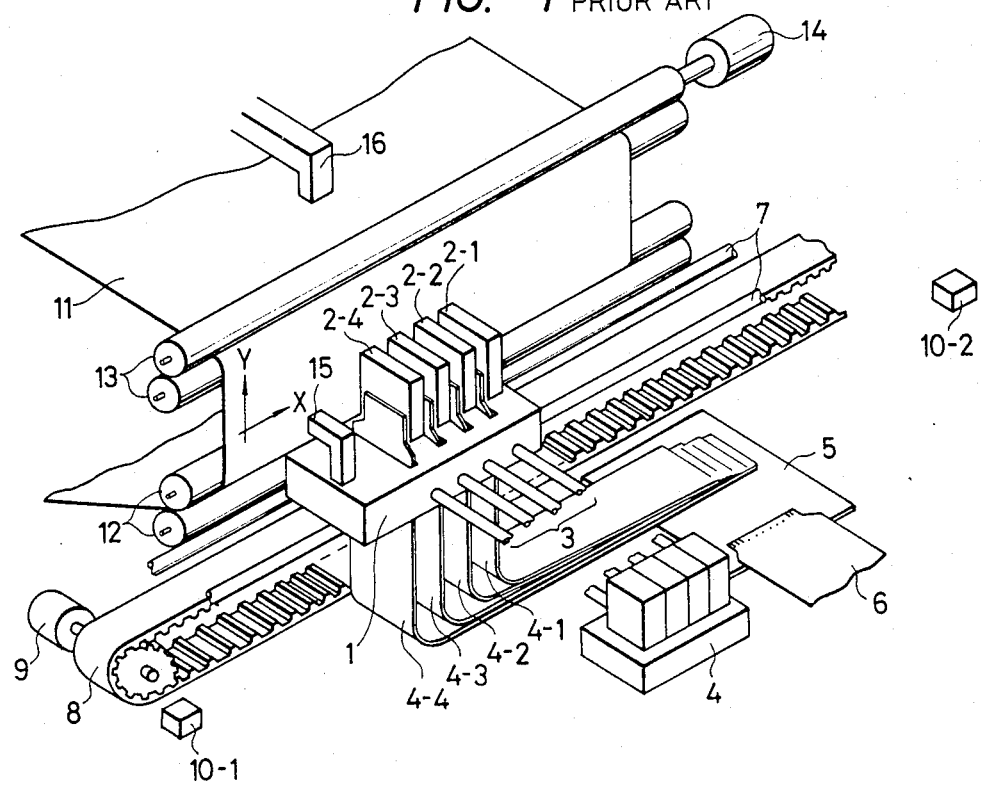
FIG. 1 is a schematic perspective view of a color ink jet printer.
Figure 2:
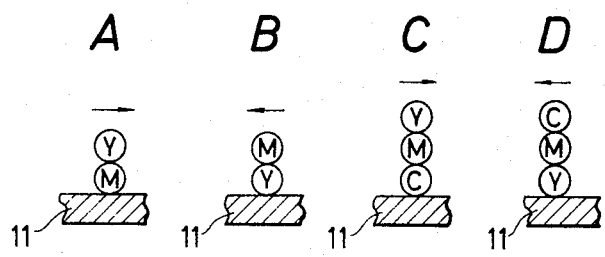
FIGS. 2A to 2D are charts showing the modes of ink dot depositions conducted by said ink jet printer.
Figure 3:
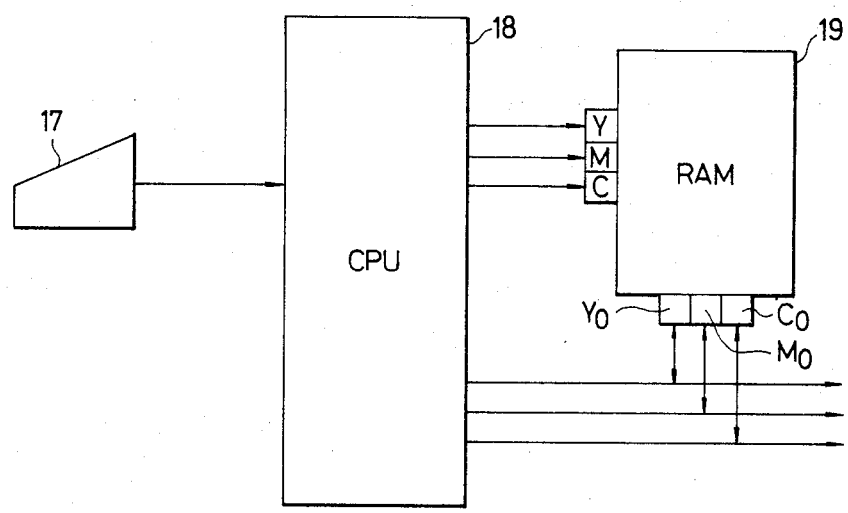
FIGS. 3A and 3B are block diagrams of a masking circuit for correcting the aberration in color mixing resulting from the modes of ink dot depositions mentioned above.
Figure 3:
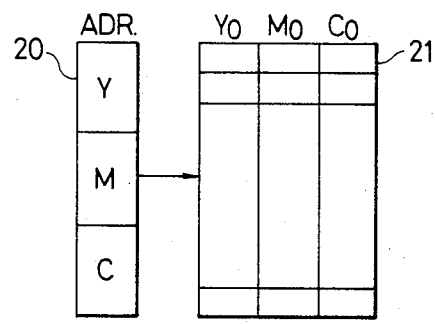

On the other hand the masking coefficients suitably selected on a console 29 are supplied to the central processing unit (CPU) 30 to prepare two masking tables, in masking table circuits 31, 32, for suitably correcting the aberrations in the mixed colors in the forward and backward motions of the main scanning as already explained in relation to FIG. 3, and either one of said masking tables is activated by a selector switch 33 according to the direction of the main scanning to transfer the data in said table to the masking memory 28. In this manner the masking memory 28 stores a masking table designed for use in the forward or backward motion of the main scanning, immediately before the start of such motion. The corrected complementary color signals C, M, Y constituting said masking table are read, by the addressing with the aforementioned digital primary color signals R', G', B' and are supplied to pattern generators 34-1–34-3, thereby reading density pattern signals for each complementary color, corresponding to the level of each corrected complementary color signal, in the column unit of density pattern composed of $4\times4$ dot matrix. Said density pattern signals are temporarily stored in picture buffer memories (PBM) 35-1–35-3, then read in synchronization with the motion of each ink nozzle head and supplied through head drivers 36-1–36-3 to the nozzle heads 37-1–37-3 thereby recording a color image in a consistent tone both in the forward and backward motions of the main scanning.

In such recording signal control circuit, desirable masking can be immediately achieved by adjusting the masking coefficients by the console 29 while observing the state of color mixing in the forward and backward motion of the main scanning, thereby enabling a color image recording without aberration in colors.

Figure 6:
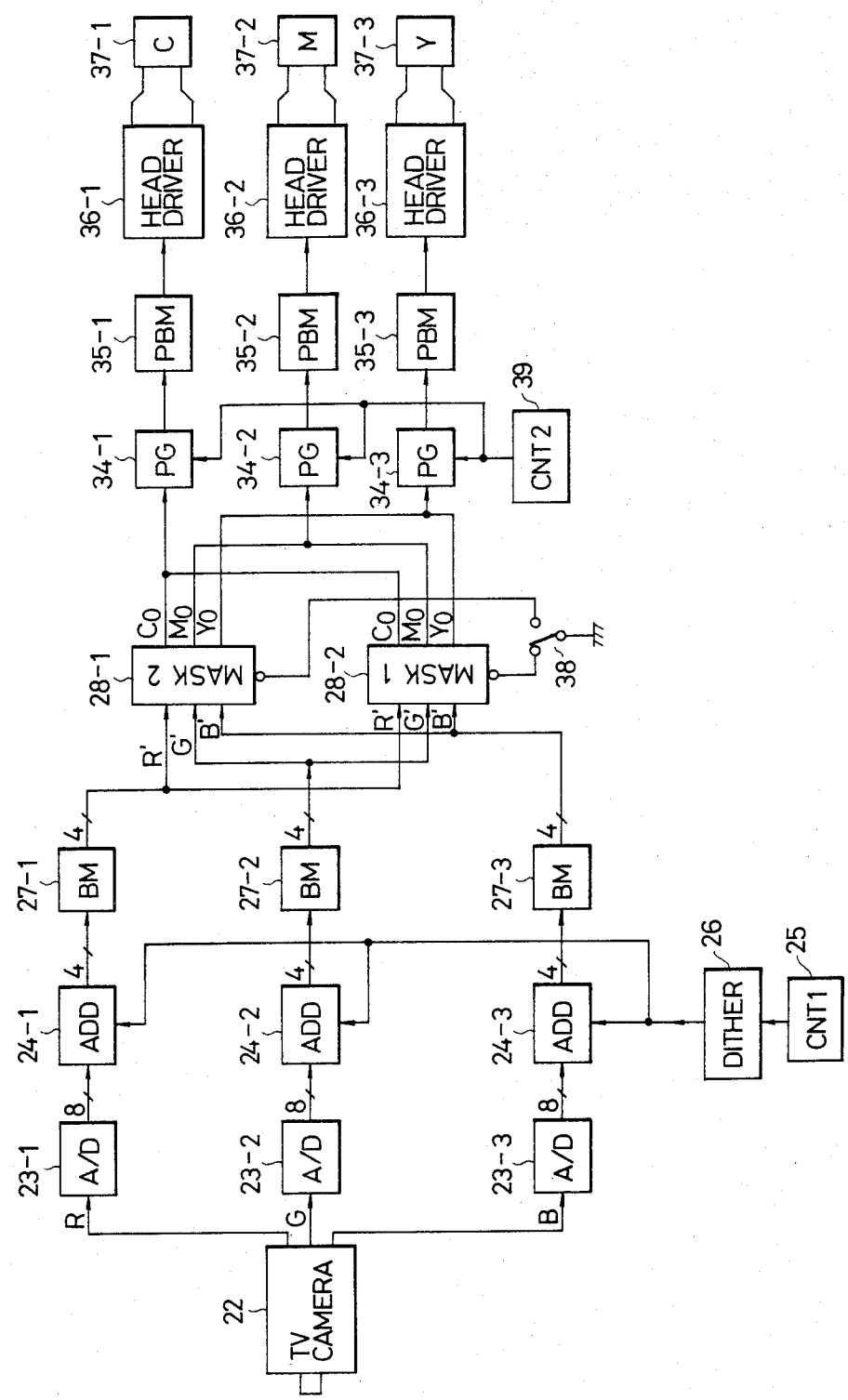
FIG. 6 is a block diagram showing another example of the record signal control circuit for use in the color ink jet printer of the present invention.

Now reference is made to FIG. 6 showing another example of the recording signal control circuit, wherein two masking memories are provided and selectively used in the forward and backward motions. In FIG. 6, same components as those in FIG. 5 are represented by same numbers. The digital primary color image signals R', G', B' supplied from the buffer memories 27-1–27-3 are respectively supplied to masking circuits 28-1–28-2 for respectively storing masking tables for the forward motion and backward motion prepared, on the masking coefficients selected by the console 17, for correcting the aberrations in the color mixing respectively in the forward and backward motion of the main scanning of the nozzle heads. Said tables are read in response to the signals obtained by complementary conversion of the digital primary color image signals R', G', B' to obtain the corresponding data of the corrected complementary color signals $C_0$, $M_0$, $Y_0$. Such masking circuits 28-1, 28-2 are selectively used in the forward and backward motion of the main scanning by a selector switch 38 to supply the obtained data to the pattern generators (PG) 34-1–34-3, which obtain density patterns, in one of 16 levels formed by $4\times4$ dot matrix corresponding to the input data, in line unit under the control of a counter (CNT2) 39. Said patterns are temporarily stored in picture buffer memories (PBM) 35-1–35-3, then read at suitable timings corresponding to the time difference of the nozzle heads in the main scanning, and supplied through the head drivers 36-1–36-3 to the nozzle heads 37-1–37-3, thereby recording a color image corresponding to the digital primary color image signals with consistent intermediate colors both in the forward and backward motions of the main scanning.

As explained in detail in the foregoing, the present invention enables secure corrections of the difference in the intermediate colors resulting from the different order of subtractive color mixing in the forward and backward motion of main scanning with a multiple recording head in a color printer, by means of selection of different masking coefficients in the forward motion and in the backward motion of main scanning through an extremely simple signal processing, thereby enabling color image recording with intermediate color tones significantly better than those obtainable in the conventional technology.

The data compression conducted prior to the masking process allows reduction of the capacity of the masking memory.

Also the present invention is partly applicable, not only to image recording but also to storage in memories, filing in disks and displays of data.

Although it has been assumed in the foregoing explanation that the image signals B, G, R are supplied from a color television camera, said signals may also be supplied from a host computer or a CCD scanner.

It is further possible to conduct additional processes such as the adjustment of contrast or the removal of the background color.

Although the foregoing explanation has been limited to the case of a color ink jet printer, the present invention is by no means limited to such case but is also applicable to other recording methods such as thermal transfer recording or wire dot recording.

What we claim is:

1. Color image forming apparatus for forming a color image on a recording member, comprising:
    dot forming means for forming colored dots in at least three colors during reciprocating relative movement of said dot forming means and the recording member in more than one direction;
    color signal processing means for converting input signals representing at least three colors into recording signals for forming the dots;
    timing control means for changing the recording sequence of said dot forming means depending on the direction of the relative movement of said dot forming means and the recording member; and
    control means for causing said color signal processing means to provide different processing depending on the direction of the relative movement of said dot forming means and the recording member.

2. Color image forming apparatus according to claim 1, wherein said color signal processing means is adapted to correct aberrations in the color of the color image caused by the change in the recording sequence of said dot forming means in the different directions of relative movement of said dot forming means and the recording member.

3. Color image forming apparatus according to claim 2, wherein said color signal processing means is adapted to mask the input signals.

4. Color image forming apparatus according to claim 3, wherein said color signal processing means effects said masking by adopting different masking coefficients for the different directions of relative movement of said dot forming means and the recording member.

5. Color image forming apparatus according to claim 3, wherein said color signal processing means includes a memory for storing data for masking and access to said memory is provided by using the input signals as address signals.

6. Color image forming apparatus according to claim 5, wherein said color signal processing means includes a first memory device for storing data for one direction of relative movement of said dot forming means and the recording member and a second memory device for storing data for another direction of relative movement of said dot forming means and the recording member.

7. Color image forming apparatus according to claim 5, wherein data supplied to said memory in one direction of relative movement of said dot forming means and the recording member are different from data supplied to said memory in another direction of relative movement of said dot forming means and the recording member.

8. Color image forming apparatus according to claim 5, wherein said memory includes random access memories.

9. Color image forming apparatus according to claim 1, wherein said dot forming means forms cyan, magenta and yellow dots.

10. Color image forming apparatus according to claim 1, wherein said dot forming means includes dot forming members associated with respective colors and said dot forming members are disposed along a direction of reciprocating relative movement of said dot forming means and the recording member.

11. Color image forming apparatus according to claim 1, wherein said dot forming means forms cyan, magenta, yellow and black dots.

* * * * *